United States Patent [19]

Karayannis et al.

[11] 4,317,898

[45] * Mar. 2, 1982

[54] CATALYST AND PROCESS FOR THE POLYMERIZATION OF OLEFINS

[75] Inventors: Nicholas M. Karayannis, Naperville; Sam S. Lee, Hoffman Estates, both of Ill.

[73] Assignee: Standard Oil Company (Indiana), Chicago, Ill.

[ * ] Notice: The portion of the term of this patent subsequent to Apr. 13, 1993, has been disclaimed.

[21] Appl. No.: 223,476

[22] Filed: Jan. 8, 1981

Related U.S. Application Data

[63] Continuation of Ser. No. 854,830, Nov. 25, 1977, abandoned, which is a continuation of Ser. No. 609,020, Aug. 29, 1975, abandoned, which is a continuation-in-part of Ser. No. 301,112, Oct. 26, 1972, abandoned, which is a continuation-in-part of Ser. No. 222,328, Jan. 31, 1972, abandoned.

[51] Int. Cl.$^3$ .......................... C08F 4/64; C08F 10/06
[52] U.S. Cl. .................................... 526/141; 525/247; 526/139; 526/150; 526/351; 252/429 B
[58] Field of Search ................................. 526/141, 150

[56] References Cited

U.S. PATENT DOCUMENTS

| | | | |
|---|---|---|---|
| 3,116,274 | 12/1963 | Boehm et al. | 526/142 |
| 3,216,987 | 11/1965 | Price | 526/139 |
| 3,240,773 | 3/1966 | Boor | 526/141 |
| 3,449,263 | 6/1969 | Walt | 526/150 |
| 3,639,375 | 2/1972 | Staiger et al. | 526/139 |
| 3,926,928 | 12/1975 | Karayannis et al. | 526/139 |
| 3,950,268 | 4/1976 | Karayannis et al. | 526/141 |

FOREIGN PATENT DOCUMENTS

| | | | |
|---|---|---|---|
| 44-20098 | 8/1969 | Japan | 526/141 |
| 867139 | 5/1961 | United Kingdom | 526/141 |
| 920118 | 3/1963 | United Kingdom | 526/141 |
| 921954 | 3/1963 | United Kingdom | 526/139 |

*Primary Examiner*—Edward J. Smith
*Attorney, Agent, or Firm*—Stephen L. Hensley; William T. McClain; William H. Magidson

[57] ABSTRACT

A novel catalyst and process for producing highly-crystalline polypropylene or pure block or terminal block types of copolymers of propylene and ethylene or propylene and another alpha-olefin in excellent yields which coproduce minor amounts of low-molecular-weight and, particularly, amorphous polymers. The catalyst comprises an aluminum alkyl compound, titanium trichloride, a sterically-hindered cyclic amine and an organotin sulfide. This novel catalyst and process are useful in polymerization techniques which use a polymerization medium or those in which the condensed monomer is polymerized from the liquid phase or those in which polymerization is accomplished from monomer substantially in the vapor phase.

5 Claims, No Drawings

CATALYST AND PROCESS FOR THE POLYMERIZATION OF OLEFINS

RELATED APPLICATIONS

This is a continuation, of application Ser. No. 854,830, filed Nov. 25, 1977, now abandoned which is a continuation of application Ser. No. 609,020, filed Aug. 29, 1975, now abandoned, which in turn is a continuation-in-part of application Ser. No. 301,112, filed Oct. 26, 1972, now abandoned, which in turn is a continuation-in-part of application Ser. No. 222,328, filed Jan. 31, 1972, now abandoned.

SUMMARY OF THE INVENTION

This invention relates to a novel catalyst and process for the polymerization of terminal olefins to produce normally-solid, crystalline polymers and more specifically to a novel catalyst and process for polymerization of alpha-olefins which produces in excellent yields normally-solid, crystalline, polymeric products wherein coproduced low-molecular-weight and, particularly, amorphous polymers are substantially reduced.

In accordance with the instant invention, alpha-olefins are polymerized to normally-solid, crystalline polymers at monomer pressures of above about atmospheric pressure and moderate temperatures with a catalyst system comprising: (a) a trialkyl aluminum compound or an alkylaluminum halide or a mixture thereof, (b) a halide of a metal belonging to Groups IVB to VIB, inclusive, of the Periodic Table, and (c) an organometallic chalcogenide and a sterically-hindered, cyclic amine. The polymeric products produced using the above-described catalyst can have low-molecular-weight and, particularly amorphous components, as measured by extraction using n-hexane, of less than one percent of the total polymer yield.

BACKGROUND OF THE INVENTION

Polymers of alpha-olefins prepared in the presence of heterogeneous catalyst systems, as for example, polypropylene prepared using a catalyst comprised of diethylaluminum chloride and titanium trichloride, contain greater or lesser amounts of low-molecular-weight and, particularly, amorphous components which, when taken alone, are viscous oils or soft, tacky solids. The presence of these alkane-soluble materials in the polymers leads to difficulties during their fabrication and to inferior physical properties of the finished item, and hence are almost always removed in commercial processes for the production of polypropylene.

In the past a number of cyclic, sterically hindered amines have been reported in the patent literature as useful (c) components, supra, to reduce the alkane-soluble fraction produced in the polymerization of alpha-olefins. See e.g., Boor, U.S. Pat. No. 3,240,773 and Hoeg et al., British Pat. No. 867,139. Additionally, Watt, U.S. Pat. No. 3,449,263 has taught the addition of bis-(trialkyltin) sulfides to mono-(hydrocarbyl)-aluminum dihalide-titanium trihalide mixtures for the polymerization of ethylene or an alpha-olefin to convert such polymerization ineffective mixtures into polymerization catalysts. However, Watt's Examples, particularly when read together with Avisun, British Pat. No. 966,678, show the alkyltin sulfide employed, bis-tributyltin sulfide, is ineffective for the use claimed.

In the above-referred to literature no claim has been made that use of such amine or organotin compound will reduce the alkane-soluble polymers produced to a point where no extraction would be necessary in the commercial process while still maintaining a commercially feasible yield of crystalline polymer. A polyolefin product containing about two percent or less of n-hexane-soluble polymer would not require a separation step prior to commercial use and hence would be economically advantageous.

Now it has been found that by using a (c) component comprising a sterically-hindered, cyclic amine and an organotin sulfide, a highly crustalline, substantially hexane-insoluble, poly alpha-olefin can be made in yields which are equal to those presently obtained in the better slurry-type processes. In addition, this catalyst functions well in polymerization processes wherein the olefin is polymerized directly from the vapor or liquid phase.

STATEMENT OF THE INVENTION

As shown in Table I, the n-hexane-soluble fraction can be reduced by the instant invention when a sterically-hindered cyclic amine and an organotin sulfide is used. Table I shows further that the polymer activity in most cases is either not substantially affected or increases under the conditions used when both an organotin sulfide and a sterically-hindered, cyclic amine is employed for polymerization.

TABLE I

Comparison of Crystalline Polypropylene Activities and n-Hexane-Solubles for Different (c) Components*

| (c) Component*** | | Crystalline Activity (grams/ gram TiCl$_3$/Hour) | n-Hexane Solubles (Percent) |
|---|---|---|---|
| (1) | 2,4-lutidine | 77.5 | 13.1 |
| (1a) | [(C$_4$H$_9$)$_3$Sn]$_2$S** and (1) | 54 | 2.1 |
| (2) | 2,6-lutidine | 43.1 | 4.7 |
| (2a) | [(C$_4$H$_9$)$_3$Sn]$_2$S and (2) | 46 | 1 |
| (3) | 2,4,6-collidine | 39 | 2.4 |
| (3a) | [(C$_4$H$_9$)$_3$Sn]$_2$S and (3) | 52 | 0.9–1.3 |
| (4) | 2,4,6-triethylpyridine | 45 | 1.9 |
| (4a) | [(C$_4$H$_9$)$_3$Sn]$_2$S and (4) | 44 | 1.1 |

*(a) and (b) components for all runs were 0.20 grams aluminum activated TiCl$_3$ (AA TiCl$_3$) and 1.1 milliliters of 25 weight percent in n-hexane ethylaluminum dichloride (EtAlCl$_2$) and 0.2 milliliters of triethylaluminum (Et$_3$Al). Amount of polymerization medium in each run was 190 milliliters of n-hexane. All runs were made using 40 p.s.i.g. propylene at 70° C. for four hours in pressure bottles.
**Hereinafter called BTS.
***Amine added in each run was 0.03 milliliters. BTS added in each run was 0.06 milliliters.

Similarly, Table II shows Crystalline Activity and n-Hexane-Solubles data for some polymerizations using diethylaluminum chloride as the (a) component and 2,4,6-collidine and BTS as the (c) component. As can be seen the combination of amine and organotin sulfide can reduce the n-Hexane-Solubles without substantially affecting the activity.

TABLE II

Comparison of Crystalline Polypropylene Activities and n-Hexane- Solubles as a Function of the Type and Amount of (c) Component*

| (c) Component Amount (mol/mol AATiCl$_3$) | | Crystalline Activity (grams/gram TiCl$_3$/hour) | n-Hexane- Solubles (Percent) |
|---|---|---|---|
| BTS | Coll** | | |
| 0 | 0 | 132 | 6.0 |
| 0.045 | 0 | 105 | 4.7 |
| 0 | 0.177 | 80 | 4.0 |

TABLE II-continued

Comparison of Crystalline Polypropylene Activities and n-Hexane- Solubles as a Function of the Type and Amount of (c) Component*

| (c) Component Amount (mol/mol AATiCl₃) | | Crystalline Activity (grams/gram TiCl₃/hour) | n-Hexane- Solubles (Percent) |
|---|---|---|---|
| BTS | Coll** | | |
| 0.03 | 0.059 | 123 | 2.8 |

*(a) and (b) components for all runs were diethylaluminum chloride and AATiCl₃ in a 2.55 to 1 mol ratio. The amount of n-hexane polymerization media was 190 milliliters. All runs were made using 40 p.s.i.g. propylene at 70° C. for two hours in pressure bottles.
**2,4,6-collidine.

The (a) components preferable for the herein-described invention are alkyl derivatives wherein the alkyl radical contains one to about six carbon atoms and, more specifically, are trialkyl aluminum compounds, alkylaluminum halide, or mixtures thereof. More preferably, the (a) component is a trialkyl aluminum, mixtures thereof with either a dialkylaluminum chloride or bromide or an alkylaluminum dichloride or dibromide, or a dialkylaluminum chloride or bromide. Most preferably, a dialkylaluminum chloride or a mixture of a trialkyl aluminum and an alkylaluminum chloride is used. The amount of (a) component to be used is based upon the reactor size, the amount of (b) component used and the amount of olefin to be polymerized as is well known to one skilled in the art.

When a mixture of trialkyl aluminum and dialkylaluminum chloride or bromide is used, preferable results are obtained in the range of about twenty to about fifty mol percent trialkyl compound and about eighty to about fifty mol percent dialkyl compound. When a mixture of trialkyl aluminum and alkylaluminum dichloride or dibromide is used, preferable results are obtained in the range of about thirty to about seventy mol percent trialkyl aluminum and about seventy to about thirty mol percent alkylaluminum dichloride or dibromide.

More preferably, the concentration range of a mixture of a trialkyl aluminum and an alkylaluminum chloride or bromide is about forty to about sixty mol percent of the trialkyl compound and about sixty to about forty mol percent of alkylaluminum dichloride or dibromide.

The (b) components useful herein are halides of metals from Groups IVB to VIB, inclusive, of the Periodic Table. More preferably, the (b) component is a chloride of titanium, vanadium, chromium, molybdenum, tungsten or zirconium and, most preferably, the (b) component is activated titanium trichloride. By activated titanium trichloride is meant a titanium trichloride which has been further activated by either physical or chemical means to a high degree of activity. The amount of the (b) component used is based upon the amount and composition of the particular polymer to be made and is well known to one skilled in the art.

The sterically-hindered, cyclic amine part of the (c) component is preferably a cyclic amine or a lower-alkyl-substituted cyclic amine of from 1–3 rings, each ring having 0–1 nitrogen atoms, which is in addition substituted by lower alkyl groups alpha, alpha' to the nitrogen atom or atoms. More preferably, the sterically hindered cyclic amine part of the (c) component is a 5 or 6-membered cyclic amine or lower-alkyl-substituted cyclic amine which is in addition substituted by lower alkyl groups alpha, alpha' to the nitrogen atom. Most preferably, the amine part is 2,4,6-collidine. By lower alkyl is here meant an alkyl group containing one to about four carbon atoms.

The chalcogenide part of the (c) component is preferably a sulfide of an alkyl, alkaryl or aryl tin radical. More preferably, this part is a sulfide of a bis-(trialkyl) or bis-(triphenyl) tin radical or a bis-(dialkyl) or bis-(diphenyl) tin radical. Most preferably, the chalcogenide part of the (c) component is a bis-(trialkyl)tin sulfide. By lower alkyl is here meant an alkyl group containing one to about six carbon atoms.

Preferably, the mol percentages of the amine and organometallic chalcogenide parts of the (c) component run from about ninety mol percent of the former and about ten mol percent of the latter to about ten mol percent of the former and about ninety mol percent of the latter. More preferably, the concentration range of the parts of the (c) component runs from about eighty-five to about twenty mol percent of the amine part and from about fifteen to about eighty mol percent of the organometallic chalcogenide part. Most preferably, the concentration range of the parts runs from about eighty-five to forty mol percent of the amine part and from about fifteen to about sixty mol percent of the organometallic chalcogenide part.

The amount of the amine part of the (c) component depends upon the amount of (a) component to be used. Too little or too much of the amine will not show an appreciable effect upon the low-molecular-weight and, particularly, the amorphous polymer produced. Preferably, the amine amount can vary from about one-tenth mol percent of the (a) component to about twenty mol percent of the (a) component. More preferably, the range is about one-half mol percent of the (a) component to about twenty mol percent of (a) component and, most preferably, it may vary from about one-half mol percent of the (a) component to about eight mol percent of the (a) component.

The order of mixing the catalyst components while not critical to reduce the n-hexane-soluble fraction can affect the yield. The order which most substantially increases the yield is to first admix either the organometallic chalcogenide or the amine with the polymerization medium and then admix the other part of the (c) component. Then the (a) component followed by the (b) component or a mixture of the (a) and (b) components is admixed with the above.

In the preferred embodiments utilizing for the (c) component, bis-(tributyl) tin sulfide and 2,4,6-collidine, activated TiCl₃ for the (b) component, and either a mixture of a trialkyl aluminum and an alkylaluminum dichloride or a dialkylaluminum chloride for the (a) component, it is found that a dialkyl alkylphosphonate, preferably diethyl ethylphosphonate, may be usefully employed as a fourth or (d) component to further increase the polymer yield without substantially increasing the n-Hexane-Solubles produced.

If such a compound is employed care must be taken to add enough of the phosphonate, based on the (a) component used, or although the yield increases the n-Hexane-Soluble fraction also increases. Preferably, a volume of diethyl ethylphosphonate between forty and eighty percent of the total volume of the alkylaluminum halide used should be employed. Most preferably, a volume of diethyl ethylphosphonate between fifty and seventy percent of the total volume of the alkylaluminum halide used should be employed.

As is obvious to one skilled in the art, precautions should be taken to avoid oxygen and moisture contamination of the catalyst during its preparation and transfer. Catalyst preparation can be carried out under an inert atmosphere using such gases as argon, nitrogen, helium, etc. Normally, during polymerization no precautions need be taken as a positive pressure of monomer gas exists within the reactor.

The temperature at which the catalyst may be used is not critical and depends, in general, upon the particular (a) and (b) components which are used. However, at temperatures below about 0° C. the rate of polymerization slows down and reactor residence times become unreasonably long whereas at temperatures above about 120° C. polymerization rates become too high and a loss of polymer crystallinity is found. Preferably, the temperature range in which the catalyst can be used is about 2° C. to about 95° C. Most preferably, the temperature range is about 50° C. to about 80° C.

The herein-described catalyst system has also proved to be highly stereospecific during the solventless (bulk) polymerization of alpha-olefins and polymerizations wherein the monomer is essentially all in the vapor phase.

Results for a solventless (bulk phase) polymerization in which liquid monomer comprises the liquid phase are shown in Table III below.

TABLE III

Propylene Polymerization Using the Bulk Phase Technique*

| Catalyst** | Crystalline Activity (grams/gram/ $TiCl_3$/hour) | n-Hexane-Solubles (Percent) |
|---|---|---|
| $Et_3Al$—$EtAlCl_2$/AA$TiCl_3$/ BTS/2,4,6-collidine | 320 | 2.1 |

*This run was made in a one-gallon reactor.
**1.1 milliliters of 25 weight-percent-in-hexane $EtAlCl_2$, 0.2 milliliters of $Et_3Al$, 0.2 grams of AA·$TiCl_3$, 0.06 milliliters of BTS and 0.03 milliliters of 2,4,6-collidine.

Another variant of the polymerization technique was employed to simulate a polymerization run with the catalyst of the instant invention in which the monomer is in the vapor phase. The results are shown in Table IV below:

TABLE IV

Propylene Polymerization Using a Modified Vapor Phase Technique*

| Crystalline Activity (grams/gram $TiCl_3$/hour) | n-Hexane-Solubles (Percent) | Duration of Run (Hours) |
|---|---|---|
| 52.4 | 0 | 1.5 |
| 25.5 | 1.44 | 8.0 |
| 13.6 | 1.73 | 20 |
| 70** | 1.15** | 5** |

*Catalyst was $Et_3Al$/$EtAlCl_2$/AA$TiCl_3$/BTS/2,4,6-collidine as follows: 1.1 milliliters of 25 weight-percent-in-hexane $EtAlCl_2$, 0.2 milliliters of $Et_3Al$, 0.2 grams of AA$TiCl_3$, 0.06 milliliters of BTS and 0.03 milliliters of 2,4,6-collidine.
**This run made using the same catalyst and conditions except for the addition of 0.1 milliliters of diethyl ethylphosphonate.

The process of the invention can be carried out at a monomer pressure of about atmospheric or above. Pressures up to about 20,000 p.s.i.g. or higher can be used. A particular advantage of this invention is that pressures of the order of 30 to 1000 p.s.i.g. give excellent results.

The organic liquid employed as the polymerization medium can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene or xylene, or a halo-generated aromatic compound such as chlorobenzene, chloronaphthalene or ortho-dichlorobenzene. The nature of the solvent is subject to considerable variation, although the solvent employed should be liquid under the conditions of reaction and relatively inert. The hydrocarbon liquids are desirably employed. Other solvents which can be used include ethylbenzene, isopropylbenzene, ethyltoluene, n-propylbenzene, diethylbenzenes, mono- and dialkylnaphthalenes, n-pentane, n-octane, isooctane and methylcyclohexane. The solvents employed in practicing this invention can be advantageously purified prior to use in the polymerization reaction by contacting the solvent, for example, in a distillation procedure or otherwise, with aluminum alkyl compound to remove undesirable trace impurities. Also, prior to polymerization the catalyst can be contacted advantageously with polymerizable alpha-olefin.

The polymerization time is not critical and will usually be of the order of from 30 minutes to several hours in batch processes. Contact times of from one to four hours are commonly employed in autoclave-type reactions. When a continuous process is employed, the contact time in the polymerization zone can also be regulated as desired, and in some cases it is not necessary to employ reaction or contact times much beyond one-half to several hours since a cyclic system can be employed by separation of the polymer and return of the polymerization medium, if used, and excess monomer to the charging zone wherein the catalyst can be replenished and additional monomer introduced.

The invention is of particular importance in the preparation of highly-crystalline polypropylene, although it can be used for polymerizing ethylene or other alpha-olefins of up to ten carbon atoms. It is also useful for preparing highly crystalline, pure-block and terminal-block types of copolymers of ethylene and propylene or propylene and another alpha-olefin. The pure-block copolymer may be composed of two different blocks or may be of the types ABAB, etc. or ABCABC, etc. Other alpha-olefins useful for copolymerization using the instant invention contain up to ten carbon atoms and normally are free from branching in the 2-position.

The process and catalyst of this invention are normally used with an additive to control molecular weight such as a dialkyl zinc compound or hydrogen, preferably hydrogen. Solid polymers having molecular weights greater than about 50,000 and less than about 5,000,000 result thereby.

The amount of hydrogen to be used depends upon the molecular weight distribution to be obtained and is well known to those skilled in the art.

While the invention is described in connection with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

GENERAL EXPERIMENTAL PROCEDURE

In Examples I-V the components of the catalyst system were charged into a pressure bottle containing 190 milliliters of n-hexane in a dry box under a nitrogen atmosphere. The pressure bottle was capped, removed from the dry box, and its contents allowed to react with propylene at 40 p.s.i.g. and 70° C. for four hours. Then, the resulting reaction mixture was deactivated with a mixture of methanol and n-hexane and the insoluble product washed with n-hexane and dried. The n-hexane-insoluble fraction divided by the polymerization time in hours is characterized as the Crystalline Activity.

The Crystalline Activity and n-Hexane-Solubles values were obtained by adding 50 milliliters of n-hexane to the polymerization slurry along with 10 milliliters of methanol and stirring for one hour. The mixture was then filtered and washed with about 100 milliliters of n-hexane and enough methanol to remove any catalyst residues from the insoluble polymer. The insoluble part was then dried at 90° C. for one hour and weighed. The filtrates above were combined and evaporated to dryness and the residue weight was taken as the non-crystalline yield, i.e., n-Hexane-Solubles.

EXAMPLE I

Catalyst System: 1.1 milliliters (25 percent wt./wt.*) EtAlCl$_2$, 0.2 milliliters Et$_3$Al, 0.2 grams of AA TiCl$_3$, 0.06 milliliters BTS

TABLE

| Pyridine Derivative** | Crystalline Activity (grams/gram TiCl$_3$/hour) | n-Hexane-Solubles (Percent) |
|---|---|---|
| 2,4-lutidine | 53.5 | 2.05 |
| 2,5-lutidine | 56.5 | 2.67 |
| 2,6-lutidine | 46.1 | 1.01 |
| 3,4-lutidine | 54.2 | 4.10 |
| 3,5-lutidine | 54.9 | 1.87 |
| 2,3,6-collidine | 48.8 | 1.38 |
| 2,4,6-collidine | 52.2 | 0.90–1.30 |
| 5-ethyl-2-methylpyridine | 65.3 | 2.41 |
| 2,4,6-triethylpyridine | 44.1 | 1.12 |
| 2,2,6,6-tetramethylpiperidine | 61.6 | 1.86 |
| 2,5-dimethylpyrrolidine | 66.7 | 2.15 |

*Solution in N-hexane.
**0.03 milliliters used.

EXAMPLE II

Catalyst System: 2.55 moles Et$_2$AlCl for each mole of AA TiCl$_3$

TABLE

| (c) Component Amount (mols/mol AATiCl$_3$) | | Crystalline Activity (grams/gram TiCl$_3$/hour) | n-Hexane-Solubles (Percent) |
|---|---|---|---|
| BTS | Coll | | |
| 0 | 0 | 132 | 6.0 |
| 0.045 | 0 | 105 | 4.7 |
| 0.089 | 0 | 94 | 3.6 |
| 0 | 0.177 | 80 | 4.0 |
| 0 | 0.354 | 89 | 6.2 |
| 0.089 | 0.177 | 109 | 3.1 |
| 0.03 | 0.059 | 123 | 2.8 |

EXAMPLE III***

Catalyst System: Et$_2$AlCl and AA TiCl$_3$

TABLE

| (c) Component Amount (mols/mol AATiCl$_3$) | | Crystalline Activity (grams/gram TiCl$_3$/hour) | n-Hexane-Solubles (Percent) |
|---|---|---|---|
| BTS | Coll | | |
| *0 | 0 | 483 | 5.6 |
| **0 | 0 | 548 | 6.8 |
| **0.018 | 0 | 608 | 10.1 |
| **0 | 0.036 | 410 | 4.8 |
| **0.018 | 0.036 | 474 | 2.8 |
| *0.027 | 0.053 | 345 | 1.8 |
| *0.014 | 0.027 | 396 | 2.7 |
| *0.0091 | 0.018 | 488 | 5.9 |

*2.55 mols Et$_2$AlCl per mol of AA TiCl$_3$ used.
**3.00 mols Et$_2$AlCl per mol of AA TiCl$_3$ used.
***One gallon reactor used. Propylene pressure was 250 p.s.i.g.

EXAMPLE IV

Diethyl ethylphosphonate (DEEP) was added as a fourth component to a BTS-2,4,6-collidine catalyst with the results shown below.

Catalyst System:
0.06 milliliters (25 percent wt./wt.) EtAlCl$_2$,
0.08 milliliters Et$_3$Al, 0.2 grams AA TiCl$_3$,
0.06 milliliters BTS, 0.03 milliliters, 2,4,6-collidine

TABLE

| DEEP (milliliters) | Crystalline Activity (grams/gram TiCl$_3$/hour) | n-Hexane-Solubles (percent) |
|---|---|---|
| 0 | 30–45 | 0.5 to 1.0 |
| 0.05 | 71.9 | 2.1 |
| 0.1 | 72.3 | 0.71 |
| 0.2 | 68.6 | 8.35 |
| 0.3 | 60.2 | 9.23 |

EXAMPLE V

Catalyst System: 1.1 milliliters (25 percent wt./wt.) EtAlCl$_2$, 0.2 milliliters Et$_3$Al, 0.2 grams AA TiCl$_3$, 0.06 milliliters BTS, 0.03 milliliters 2,4,6-collidine

TABLE

| DEEP (milliliters) | Crystalline Activity (grams/gram TiCl$_3$/hour) | n-Hexane-Solubles (Percent) |
|---|---|---|
| 0 | 52.2 | 0.9–1.3 |
| 0.05 | 42.8 | 0.43 |
| 0.1 | 69.4 | 5.05 |
| 0.2 | 59.8 | 7.35 |

EXAMPLE VI

A series of polymerizations were carried out repeating Example 6 of Watt, U.S. Pat. No. 3,449,263. The results of these polymerizations made by adding 50 ml. of dried hexane, 2.9 millimols ethylaluminum dichloride (EADC), and 1.1 millimols bis-tributyltin sulfide to a pressure bottle and stirring for one hour at 70° C., then adding 1.4 millimols titanium trichloride, and polymerizing during a five hour agitation of the reaction mixture at 70° C. under 35 p.s.i.g. propylene pressure are as follows.

TABLE

| Run No. | System*** | Solid Polymer (grams) | Yield Solid Polymer (g./g TiCl$_3$) |
|---|---|---|---|
| 1 | EADC/TiCl$_3$ | 0.22 | 1.02 |
| 2 | EADC/TiCl$_3$ | 0.27 | 1.25 |
| 3 | EADC/TiCl$_3$/BTS | 0.15 | 0.694 |
| 4 | EADC/TiCl$_3$/BTS | 0.17 | 0.787 |
| 5 | EADC/TiCl$_3$ | 0.21 | 0.972 |
| 6* | EADC/TiCl$_3$ | 0.31 | 1.44 |
| 7 | EADC/TiCl$_3$/BTS | 0.16 | 0.741 |
| 8* | EADC/TiCl$_3$/BTS | 0.20 | 0.926 |
| 9** | EADC/TiCl$_3$ | 0.25 | 1.16 |
| 10** | EADC/TiCl$_3$ | 0.26 | 1.20 |
| 11** | EADC/TiCl$_3$/BTS | 0.21 | 0.972 |

TABLE-continued

| Run No. | System*** | Solid Polymer (grams) | Yield Solid Polymer (g./g TiCl₃) |
|---|---|---|---|
| 12** | EADC/TiCl₃/BTS | 0.21 | 0.972 |

*Run at 40 p.s.i.g. propylene instead of 35 p.s.i.g. as in Watt Example 6.
**As no washing procedure is specified in Watt Example 6, the solid polymer was washed 3× with hexane in all the runs except runs 9, 10, 11 and 12 where the washing was done as in Watt Examples 2-4, i.e., 3× with methanol. It can be seen that the results are not significantly different.
***TiCl₃ was Stauffer Chemical Company, AA grade, as specified in Examples 7-14 of Watt.

The average solid polymer produced without the use of BTS, runs 1, 2, and 5, is 0.23 grams and the average solid polymer for runs 3, 4, and 7 with the use of BTS is 0.16 grams.

The average solid polymer produced without the use of BTS, runs 9 and 10, is 0.24 grams and the solid polymer produced in runs 11 and 12 with the use of BTS is 0.21 grams.

EXAMPLE VII

A 24.6 milliliter portion of dry hexane and 12.5 milliliters of titanium tetrachloride are added to a 300 milliliter round bottom flask. The flask and its contents were protected under a blanket of dry nitrogen throughout the preparation. The solution was stirred with a magnetic stirring bar and cooled in an ice bath maintained at −1° C. A 74.8 milliliter portion of diethylaluminum chloride in hexane (24.4 weight percent diethylaluminum chloride, solution density 0.739 grams/milliliter) was added dropwise to the titanium tetrachloride solution over a three-hour period. After the alkyl addition was complete, the slurry was stirred at −1° C. for 15 minutes, fitted with a condenser, and then heated to 65° C. within one hour. The slurry was stirred at 65° C. for one hour. After cooling to room temperature, the solid was washed with five 42 milliliter portions of dry hexane by decantation with the last wash performed at 65° C.

The solid was decanted, 144 milliliters of dry hexane and 21.3 milliliters isopentyl ether added, and the slurry stirred at 35° C. for one hour. The solid was then washed with five 42 milliliter portions of dry hexane by decantation.

A 70.8 milliliter portion of a 20.3 volume percent stock solution of titanium tetrachloride in hexane (46.3 milliliters titanium tetrachloride plus 181.8 milliliters hexane) was added to the decanted solid. The slurry was stirred at 62°-65° C. for two hours and cooled to room temperature. The solid was washed with five 42 milliliter portions of dry hexane by decantation with the last wash performed at 65° C. The solid was decanted and 50 milliliters of dry hexane added. A 1.0 milliliter portion of the final slurry contained 0.295 grams of brown solid.

A surface area measurement made on the dry, brown solid indicates the material has a surface area of about 106 sq. meters per gram.

An analysis of the brown colored solid showed that it contains 22.5 percent titanium, 0.6 percent aluminum, 59.8 percent chlorine and 10.0 percent isopentyl ether.

EXAMPLE VIII

A 49.2 milliliter portion of dry hexane and 25 milliliters of titanium tetrachloride were added to a 50 milliliter round bottom flask. The flask and its contents were protected under a blanket of dry nitrogen throughout the preparation. The solution was slowly stirred with a magnetic stirring bar and cooled in an ice bath maintained at −1° C. A 149.6 milliliter portion of diethylaluminum chloride in hexane (24.4 weight percent diethylaluminum chloride, solution density 0.739 grams/milliliter) was added dropwise over a three-hour period. After the alkyl addition was complete, the slurry was slowly stirred at −1° C. for 15 minutes, fitted with a condenser, and then heated to 65° C. within an hour. The slurry was slowly stirred at 65° C. for one hour. After cooling to room temperature the solid was washed with five 84 milliliter portions of dry hexane by decantation with the last wash performed at 65° C.

The solid was decanted, 288 milliliters of hexane and 42.6 milliliters of isopentyl ether added, and the slurry slowly stirred at 35° C. for one hour. The solid was then washed with five 84 milliliter portions of dry hexane, and the resulting slurry split into four equal parts.

One of the parts was decanted and 54.5 milliliters of a 13 volume percent titanium tetrachloride solution in hexane was added to the solid. The slurry was slowly stirred at 65° C. for two hours and cooled to room temperature. The solid was washed with five 25 milliliter portions of dry hexane by decantation with the last wash performed at 65° C. The solid was decanted and 50 milliliters of additional hexane was added. A 1.0 milliliter portion of the final slurry contained 0.141 grams of brown solid.

An analysis of the brown solid showed that it contains 26.6 percent titanium, 0.6 percent aluminum, 58.2 percent chlorine and 9.5 percent isopentyl ether.

EXAMPLE IX

The procedure of this Example is the same as Example VIII except that, after the slurry was divided into four equal parts, one of the parts was decanted, and 35.4 milliliters of a 20.3 volume percent titanium tetrachloride solution in hexane added to the solid. The slurry was slowly stirred at 65° C. for 105 minutes and cooled to room temperature. The solid was washed with five 25 milliliter portions of dry hexane by decantation with the last wash being performed at 65° C. The solid was decanted and 50 milliliters of hexane added. A 1.0 milliliter portion of the final slurry contained 0.158 grams of brown solid.

An analysis of the brown solid showed that it contains 26.2 percent titanium, 0.7 percent aluminum, 59.4 percent chlorine and 6.3 percent of isopentyl ether.

EXAMPLE X

The procedure of this Example is the same as Example VII except that, after the solid was washed with five 42 milliliter portions of dry hexane by decantation, 35.4 milliliters of a 20.3 volume percent titanium tetrachloride solution in hexane was added to the solid. The slurry was slowly stirred at 65° C. for 105 minutes and cooled to room temperature. The solid was washed with five 25 milliliter portions of dry hexane by decantation with the last wash being performed at 65° C. The solid was decanted and 50 milliliters of hexane was added. A 1.0 milliliter portion of the final slurry contained 0.158 grams of brown solid.

EXAMPLE XI

The propylene polymerizations of this Example were carried out in a pressure bottle at 40 p.s.i.g. and 70° C. in two-hour runs using the below indicated amounts of brown solid, 1.0 milliliter of 24.4 weight percent diethylaluminum chloride and 200 milliliters of hexane polymerization medium.

TABLE

| Example No. and Weight (grams) | Rate (grams/gram brown solid/hour) | n-Hexane Solubles (%) |
|---|---|---|
| VII 0.0875 | 253 | 10.9 |
| VII 0.0875 | 219 | 2.5* |

*To this polymerization 0.008 milliliters of bis-(tributyl)tin sulfide and 0.004 milliliters of 2,4,6-collidine was added.

EXAMPLE XII

The polymerizations of this Example were carried out at 160° F. for about one hour in a one gallon reactor at over 250 p.s.i.g. propylene pressure and a small hydrogen partial pressure using 1200 milliliters of hexane as a polymerization medium. The catalyst used was diethylaluminum chloride, brown solid, BTS and 2,4,6-collidine in a 2.8/1.0/0.014/0.027 molar ratio. Mols brown solid was calculated assuming the brown solid was entirely titanium trichloride.

TABLE

| Example No. and Weight (grams) | Rate (grams/gram brown solid/hour) | n-Hexane Solubles (%) |
|---|---|---|
| IX 0.1 | 2002 | 2.1* |
| X 0.1 | 2170 | 4.2 |
| X 0.1 | 2226 | 2.5 |
| X 0.1 | 2320 | 1.5* |
| IX 0.1 | 1215 | 3.3*, ** |
| X 0.1 | 1422 | 4.4** |
| X 0.1 | 1583 | 1.7*, ** |

*Run at a 2.8/1.0/0.028/0.054 molar ratio, diethylaluminum chloride, brown solid, BTS and 2,4,6-collidine.
**Four hour runs.

EXAMPLE XIII

The following liquid phase (bulk) propylene polymerizations were carried out in a one liter reactor for two hours at 160° F. using 460 pounds propylene pressure and a small amount of hydrogen. In each run 0.3 milliliters of a 24.4 weight percent diethylaluminum chloride in hexane solution was used.

TABLE

| Example No. and Amount (grams) | Rate (grams/gram brown solid/hour) | n-Hexane Solubles (%) |
|---|---|---|
| X 0.03 | 3084 | 4.8 |
| X 0.03 | 3187 | 1.6* |
| VIII 0.021 | 2390 | 1.3* |
| X 0.028 | 2322 | 0.9*, ** |

*0.0025 milliliters BTS and 0.00125 milliliters 2,4,6-collidine used.
**0.32 milliliters of a 24.4 weight percent diethylaluminum chloride in hexane solution was used.

What is claimed is:
1. In a process for preparing highly-crystalline polypropylene or pure block or terminal block types of copolymers of propylene and ethylene or propylene and another alpha-olefin using a component (a), a dialkylaluminum chloride, a mixture of from about 30 to about 70 mol% trialkylaluminum and from about 70 to about 30 mol% alkylaluminum dichloride, or a mixture of from about 20 to about 50 mol% trialkylaluminum and from about 80 to about 50 mol% dialkylaluminum chloride, and a component (b), activated titanium trichloride, the improvement which comprises admixing with components (a) and (b) a (c) component capable of reducing the production of alkane soluble products without substantial decreases in polymerization activity comprising a bis-(trialkyl)tin sulfide and 2,4,6-collidine, such that the amount of said 2,4,6-collidine runs from about one-tenth mol percent to about twenty mol percent of the amount of said component (a) present and about ten to about ninety mol percent of the amount of said (c) component.

2. The process of claim 1 wherein said component (a) is a dialkylaluminum chloride.

3. The process of claim 2 wherein said amount of said 2,4,6-collidine runs from about one-half mol percent to about 20 mol percent of the amount of said component (a) present.

4. The process of claim 2 wherein said bis-(trialkyl)tin sulfide is bis-(tributyl)tin sulfide.

5. The process of claim 4 wherein said 2,4,6-collidine runs from about one-half mol percent to about 20 mol percent of the amount of said component (a) present.

* * * * *